Oct. 31, 1944.  J. L. BIRD  2,361,738
LIQUID LEVEL INDICATOR
Filed Feb. 8, 1943  2 Sheets—Sheet 1

INVENTOR
JOHN L. BIRD
BY
Paul B. Hunter
ATTORNEY

Oct. 31, 1944.　　　　J. L. BIRD　　　　2,361,738
LIQUID LEVEL INDICATOR
Filed Feb. 8, 1943　　　　2 Sheets-Sheet 2

INVENTOR
JOHN L. BIRD
BY Paul B. Hunter
ATTORNEY

Patented Oct. 31, 1944

2,361,738

UNITED STATES PATENT OFFICE 2,361,738

LIQUID LEVEL INDICATOR

John L. Bird, Lake Success, N. Y.

Application February 8, 1943, Serial No. 475,195

7 Claims. (Cl. 73—301)

This invention relates, generally, to the measurement of the height of liquids in tanks, as, for example, the height of liquid fuel in storage tanks such as those used in tankers, and the invention has reference, more particularly, to a novel liquid level indicator system for accomplishing this function.

Liquid level indicators heretofore generally used have been somewhat unsatisfactory owing to the fact that most of these indicators employ delicate parts which are subject to corrosion and are apt to get out of adjustment and wherein errors increase generally with the age of the apparatus.

The principal object of the present invention is to provide a novel liquid level indicating system that is of simple, rugged construction, and which is readily installed in liquid storage tanks and elsewhere where accurate and dependable height indication of the liquids therein is desired.

Another object of the present invention is to provide a novel liquid level indicator system employing a flexible diaphragm that is immersed in the liquid and is relatively movable in response to changes in liquid level, the said diaphragm being connected to a novel electromagnetic pick-up element for actuating the latter, together with connected control circuits and an indicator that is operated to accurately indicate the liquid level in the tank or tanks containing the electromagnetic pick-up element.

Still another object of the present invention is to provide a novel liquid level indicating system wherein the liquid level within one of a plurality of tanks or vessels is adapted to be indicated at a remote point, the said indicator system being unaffected by corrosion or temperature changes and having a long life in use.

Other objects and advantages of this invention will become apparent as the description proceeds.

Figure 2:
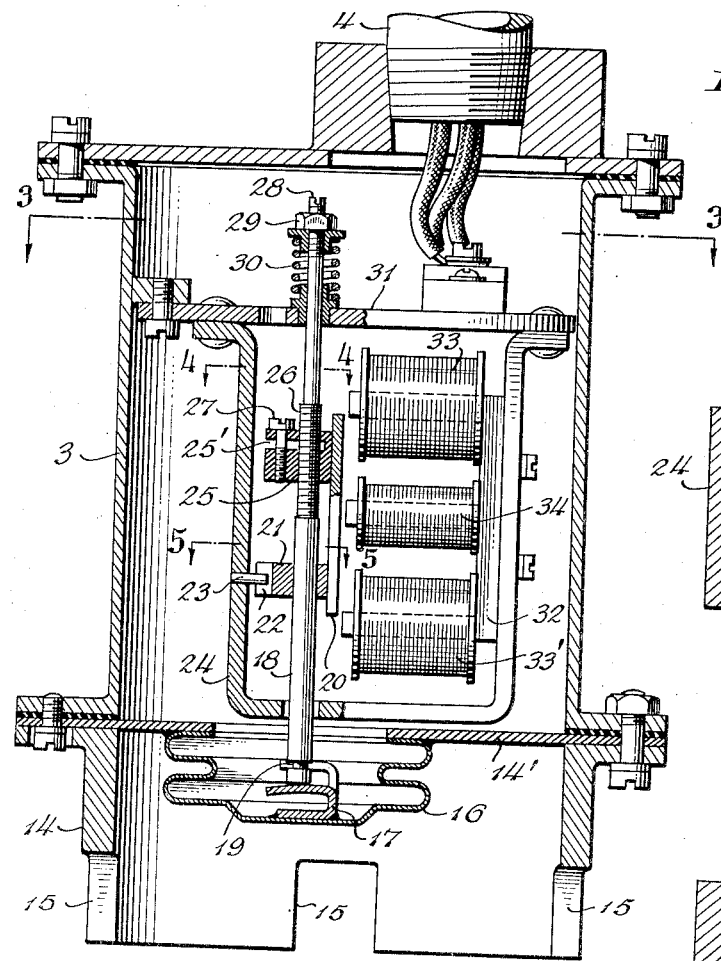
Fig. 2 is an enlarged vertical sectional view of the pick-up element illustrated in Fig. 1.
Figure 4:
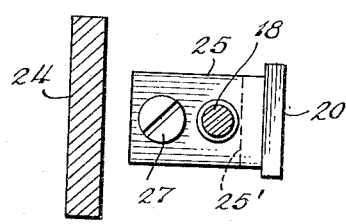
Figure 5:
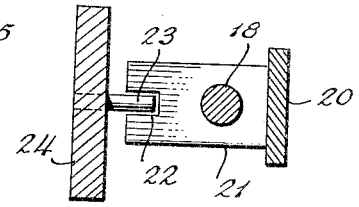
Figure 3:
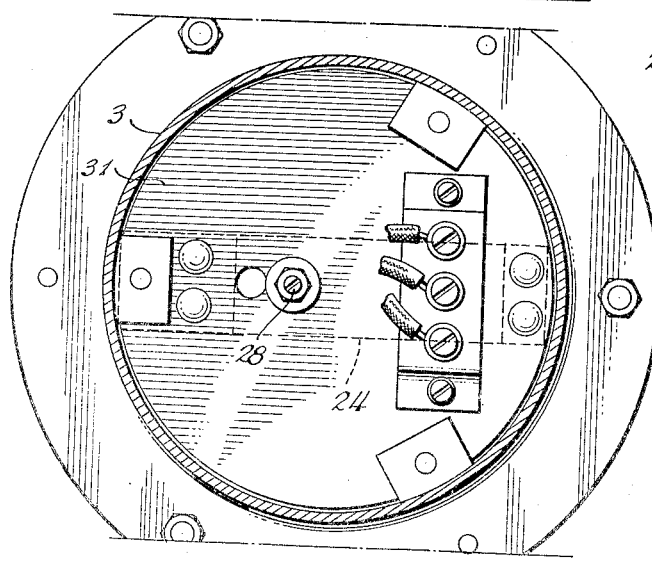
Fig. 3 is a sectional view taken along line 3—3 of Fig. 2.

Figs. 4 and 5 are detailed sectional views taken along lines 4—4 and 5—5 of Fig. 2.

Figure 6:
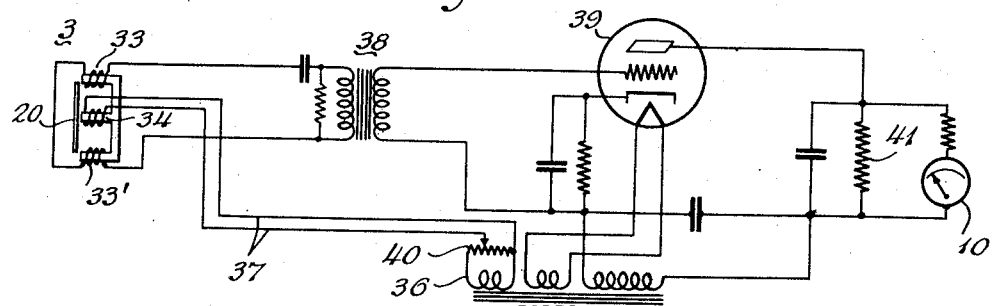

Fig. 6 is a schematic wiring diagram of the electrical circuits involved, and

Figure 7:
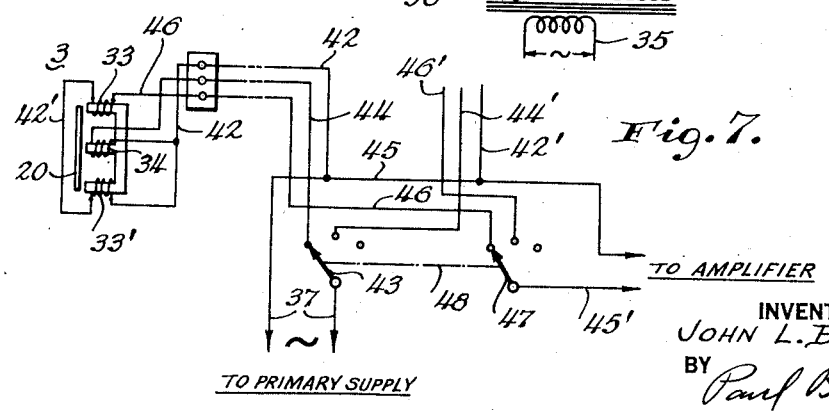

Fig. 7 is a fragmentary wiring diagram showing a typical application of the system of the present invention.

Referring now to the drawings, the reference numerals 1 and 2 designate storage tanks adapted to contain a liquid or liquids whose heights are desired to be indicated as at a remote point. Contained at the bottoms thereof within these tanks are electromagnetic pick-up units 3. Rigid cable conduits 4 extend upwards from the tops of units 3 and through cover plates 5 at the tops of the tanks. These cover plates are shown bolted to the tanks and coil compression springs 6 are shown inserted between the cover plates and adjustable collars 7 on the conduits 4 for the purpose of holding the units 3 firmly in contact with the bottoms of the tanks. Cables 8 are shown connecting the upper ends of conduits 4 to a remote indicator panel 9 having a liquid height indicator meter 10 thereon together with push button selector switches 11, the said switches serving to select the pick-up unit of any particular tank whose liquid level height it is desired to be indicated by the meter 10. An on-off switch is shown at 12 and a pilot lamp is shown at 13.

The electromagnetic pick-up unit 3 is shown in detail in Figs. 2 to 5. This unit comprises a sealed casing having an apron or skirt 14 projecting downwardly from its lower end, the said apron being provided with openings 15 for accommodating the ingress and egress of liquid. Contained within the apron 14 is a flexible diaphragm or bellows 16 exposed to the head of liquid within the tank. Within this bellows 16 there is a central connecting lug or yoke 17 to which the lower end of a rod 18 is turnably connected as by having the yoke 17 fit within an annular slot 19 in the lower end of the rod 18. The construction is such that in assembling the unit 3 the apron 14 together with the head 14' thereof carrying the bellows 16 can be inserted over the rod 18 and coupled thereto by slight transverse movement of the apron so that the slotted rod is engaged by the forked upper end of the yoke 17. Thus, any height and resultant pressure variations of the contained liquid will serve to flex the diaphragm 16 up or down, as the case may be, thereby correspondingly effecting vertical movement of the rod 18.

An armature 20 is adjustably positioned upon the rod 18. This armature is shown as a substantially flat member having an upstanding leg 21 that is slidably mounted upon the rod 18, the outer end of this leg having a slot 22 therein within which a pin 23 carried by a frame 24 engages and serves to prevent rotation of the armature bodily when the rod 18 is turned as will further appear. The armature 20 has another upstanding leg 25 that is threaded upon a reduced portion 26 of the rod 18. The leg 25 is shown split at 25' and has a screw 27 threaded therethrough for binding the leg upon the threaded portion 26 and against turning movement thereon once the armature 20 has been longitudinally adjusted to a desired position along the rod 18.

The upper end of the rod 18 is shown slotted at 28 as for receiving a screw driver for turning the same. The upper portion of this rod is also threaded for receiving the nut 29 engaging a compression spring unit 30 surrounding the rod and bearing against the transverse frame member 31. The armature 20 cooperates with a transformer structure consisting of a three-legged core 32 having outer windings 33, 33' and an inner winding 34 thereon. In installing the pick-up unit it is essential that the armature 20 be centrally positioned with respect to the two outer coils 33 and 33', i. e., the armature 20 should have its ends similarly positioned with respect to the pole tips of these coils as shown in Fig. 2.

Referring now to the schematic wiring diagram shown in Fig. 6, a suitable alternating current supply is fed through the primary 35 of a transformer having one secondary winding 36 used to supply through leads 37 alternating current to the central exciting coil 34 of the pick-up unit 3. The outer coils 33, 33' of this pick-up unit are connected in series and also in series with the primary of an input transformer 38 of an amplifier 39. The secondary 36 is shown supplied with a potentiometer 40 for varying the exciting alternating current, as desired. The output circuit of amplifier 39 is shown having a resistor 41 therein which is arranged in parallel with an indicating meter 10 as of the galvanometer type and which may be directly calibrated in height units such as feet and inches. In an actual installation the diagram of Fig. 6 is somewhat simplified by using a common lead 42 instead of two separate leads as is indicated in Fig. 7. The central energizing coil 34 in Fig. 7 is fed from suitable supply leads 37, one of which leads is connected through a switch 43 to a lead 44 connected to the outer end of the central exciting coil 34, the inner end of this coil being connected to the common lead 42, which common lead is connected through lead 45 to the other supply lead 37. It will be noted that the common lead 42 is connected with the inner end of secondary coil 33' and extends from this coil as lead 42' to the outer end of secondary coil 33 from which a lead 46 extends to one stationary contact of a switch 47. Switches 43 and 47 are interconnected as shown at 48, the arm of switch 47 being connected by a lead 45' to the amplifier, the lead 45 also being connected to the input of the amplifier, i. e., amplifier 39 of Fig. 6.

Figure 1:
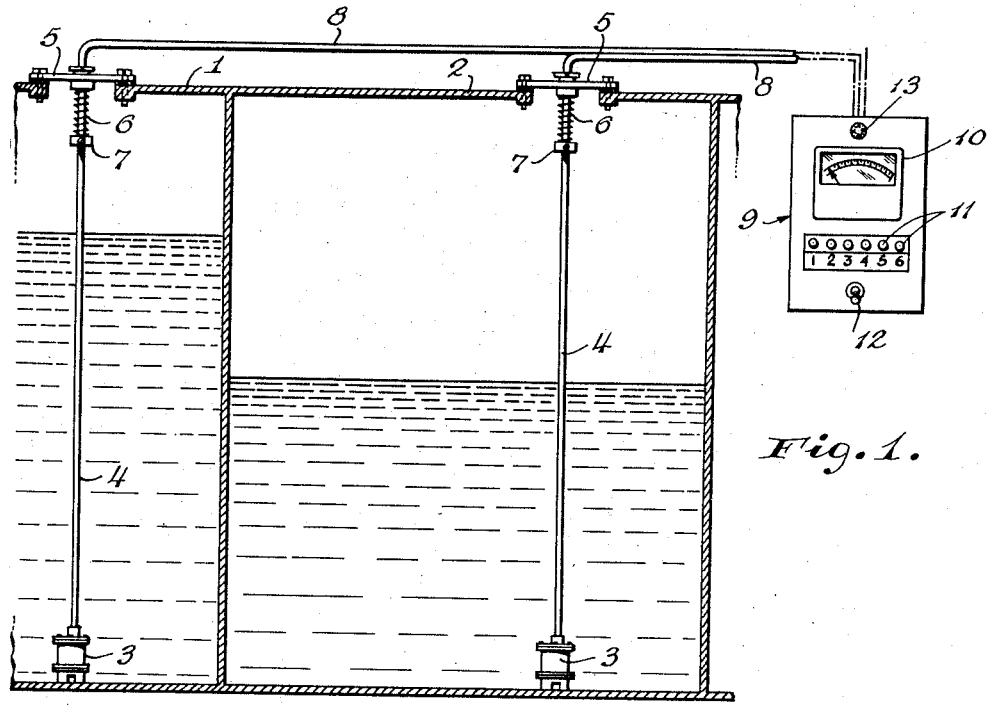
Fig. 1 is a sectional elevational view of a plurality of storage tanks showing the system of the present invention applied thereto.

Thus, with switch arms 43 and 47 in the positions shown, the central coil 34 of the pick-up unit shown in Fig. 7 is excited and any movement of the armature 20 is immediately reflected in the production of a differential voltage output from 33 and 33', which differential voltage is fed to the amplifier for actuating the connected meter 10. An additional pick-up unit is adapted to be connected to leads 42', 44' and 46' so that by turning switch arms 43 and 47 to the second pair of stationary contacts the pick-up unit associated with said second pair of contacts is energized and its output used for supplying the amplifier. Thus, it is possible to select any one of a plurality of pick-up units located in different tanks and the output of any desired pick-up unit used for controlling the meter 10. In Fig. 1 the switching means is shown as of the push button type, whereas in Fig. 7 this switching means is shown as of the hinged arm type, although either may be used.

In installing the pick-up unit it is essential that the armature 20 be similarly positioned with respect to the pole tips of the outer windings 33 and 33' in order that the output of these windings will exactly nullify each other when the tank is empty. The unit is generally assembled with the armature 20 horizontal, whereupon this armature is adjusted upon the rod 18 by turning this rod through insertion of a screw driver in the slot 28. If the armature is properly adjusted so that the differential voltage from the windings 33 and 33' are zero, the screw 27 is tightened thereby locking the leg 25 in place upon the rod 18. However, when the unit is turned to the vertical position, i. e., with the armature vertical, the weight of this armature and the connected parts tends to make the same sag slightly, and to correct for this sag, the nut 29 is tightened thereby compressing spring unit 30 and raising armature 20 slightly to overcome the effect of gravity and again position this armature centrally with respect to the pole pieces of the coils 33 and 33'.

In operation, when liquid is admitted to the tank containing the pick-up unit 3 liquid pressure upon the bellows 16 serves to move the rod 18 upwardly thereby causing more magnetic flux to thread through the core of coil 33 than to thread through the core of coil 33', resulting in a differential voltage output which is supplied to the amplifier 39 and after amplification is supplied to the meter 10 which is calibrated for indicating directly the height of the liquid within the tank.

The liquid level indicating system of this invention is applicable to one or any plurality of liquid containing vessels or tanks and owing to the sensitivity of the pick-up used, great accuracy of height indication is maintained. Since the bellows 16 is the only part exposed to the liquid the apparatus is not bothered with corrosion.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A liquid level indicator system comprising an electromagnetic pick-up unit having a fluid pressure actuated armature and cooperating inductively coupled coils, inductive coupling means for said coils, means for exciting one of said coils, and height indicator means arranged to be connected to be controlled from two others of said coils connected in opposition, movement of said armature serving to vary the relative reactances of said two other coils.

2. In a fluid pressure indicating system, a hermetically sealed pick-up unit arranged to be immersed in a body of fluid, said pick-up unit having a flexible diaphragm exposed to the surrounding fluid, an electromagnetic pick-up within said unit having a primary winding and opposed secondary windings, means for supplying said primary winding with alternating current, a movable armature cooperative with said windings, and means operable by movements of said diaphragm for actuating said armature to effect the production of a net output voltage from said secondary windings.

3. In a liquid level indicator system, comprising a closed receptacle having a flexible diaphragm exposed to liquid whose height it is desired to measure, an electromagnetic pick-up within said receptacle having a three-legged core, the central leg of which core is provided with an exciting primary winding and the outer legs thereof provided with secondary windings connected in opposition, means for exciting said primary winding, an armature cooperating with said core and windings and normally positioned so that equal flux densities exist in the outer core legs, and means connecting said armature to said flexible diaphragm for actuation by the latter to thereby differentially vary the flux density in the outer core legs to effect differential current flow from said outer core leg windings.

4. A liquid level indicator system as defined in claim 3 wherein means is provided for accurately and adjustably positioning said armature with respect to said core legs.

5. A liquid level indicator system as defined in claim 3 wherein amplifier means is provided for amplifying the differential outputs of said outer core leg windings, and liquid height indicator means connected to the output of said amplifier.

6. A liquid level indicator system, comprising a plurality of electromagnetic pick-ups having movable armatures responsive to variations in liquid height, said pick-ups each having opposed output coils producing output voltages responsive to movements of their respective armatures, indicating means, and switching means for selectively connecting the output of any one of said pick-ups for controlling the operation of said indicator means.

7. A fluid height indicator system adapted to selectively measure the height of liquids in a plurality of tanks, comprising electromagnetic pick-up units installed in each of said tanks, each of said units having opposed output coils acting to produce an output voltage dependent upon the height of liquid in its respective tank, height indicator means connected to be controlled from said opposed pick-up coils, and switching means interposed between said pick-up units and said height indicator means for selectively connecting any one of said pick-up units to said indicator means to thereby cause the same to indicate the height of the liquid in that particular tank.

JOHN L. BIRD.